July 15, 1969          E. MARTINEZ          3,455,631

REAR PROJECTION SCREEN CABINET

Filed Nov. 3, 1966          3 Sheets-Sheet 1

INVENTOR
EUGENE MARTINEZ

BY
Kane, Dalsimer, Kane & Smith
ATTORNEYS

July 15, 1969     E. MARTINEZ     3,455,631
REAR PROJECTION SCREEN CABINET
Filed Nov. 3, 1966     3 Sheets-Sheet 2
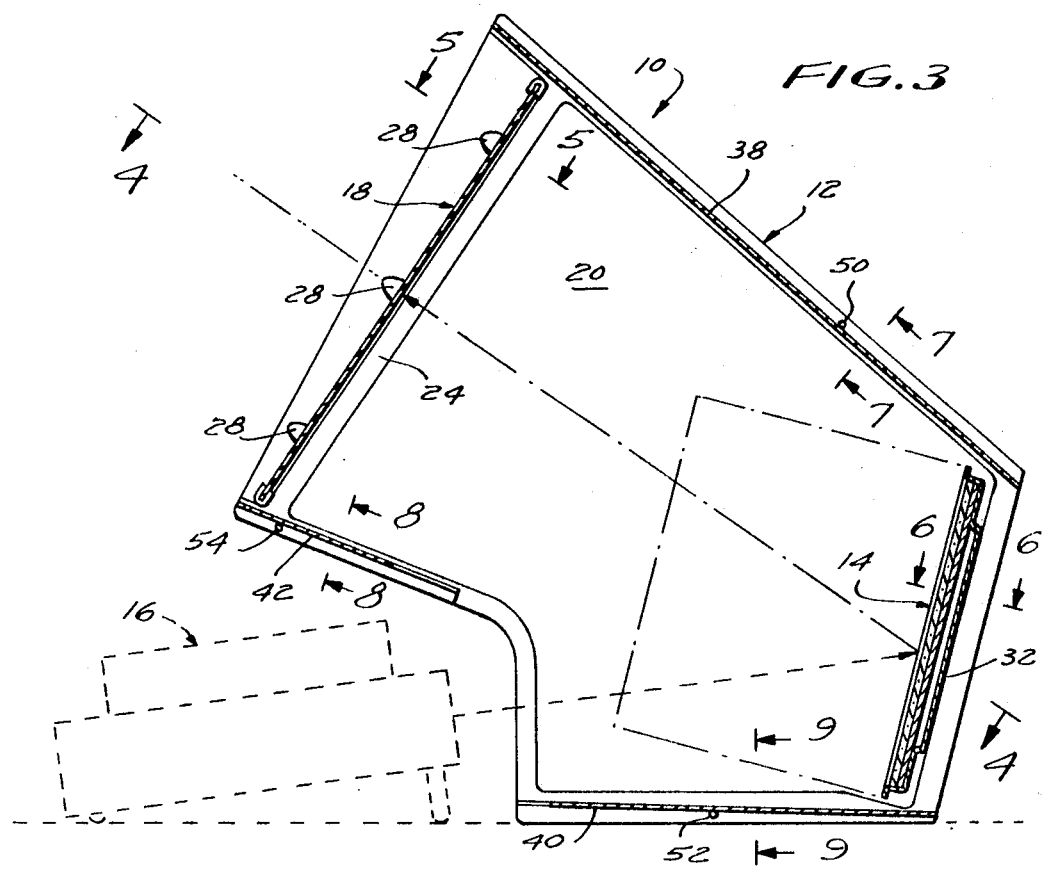
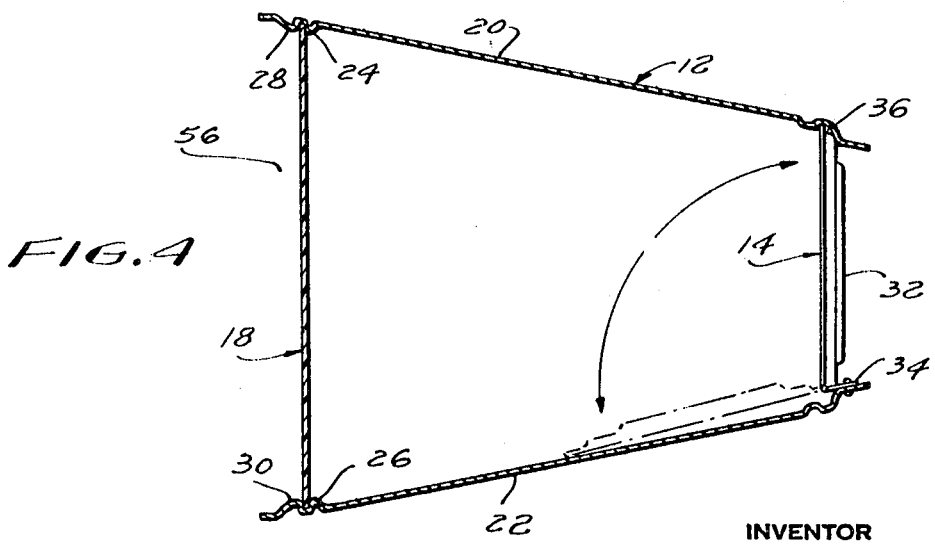
INVENTOR
EUGENE MARTINEZ
BY
Kane, Dalsimer, Kane & Smith
ATTORNEYS July 15, 1969  E. MARTINEZ  3,455,631
REAR PROJECTION SCREEN CABINET
Filed Nov. 3, 1966  3 Sheets-Sheet 3

INVENTOR
EUGENE MARTINEZ
BY
Kane, Dalsimer, Kane & Smith
ATTORNEYS

United States Patent Office 3,455,631
Patented July 15, 1969

3,455,631
REAR PROJECTION SCREEN CABINET
Eugene Martinez, Irvington, N.Y., assignor to Hudson Photographic Industries Inc., Irvington, N.Y., a corporation of New York
Filed Nov. 3, 1966, Ser. No. 591,888
Int. Cl. G03b 21/28, 21/30
U.S. Cl. 353—79                                6 Claims

ABSTRACT OF THE DISCLOSURE

A collapsible rear projection screen cabinet is provided which is adapted to be assembled in an erect position for permitting viewing of a projected image on a rear projection screen. This screen is adapted to extend across a front opening defined by the cabinet walls. These walls define another opening through which a projected image is adapted to be directed on to a reflecting mirror which in turn directs the image on to the rear projection screen. In collapsing the cabinet, the screen is adapted to be shifted away from the cabinet opening and the mirror is adapted to be similarly shifted whereupon hinge means forming part of the cabinet permits the cabinet to readily assume a folded collapsed condition.

---

The present invention relates to a rear projection screen cabinet and, more particularly, to a collapsible and portable screen cabinet adapted to be folded to portfolio proportions to facilitate carrying and storage thereof.

Over the past several years, there has been an ever-increasing trend towards the use of rear projection screens in the educational and industrial fields and many other fields as well. This is especially true because of the ability to view an image in a fully illuminated room and the substantial elimination of the requirement for a darkened room. With respect to the latter, it has been found that, in many cases, psychological and technical requirements would forbid darkening a room in which it is desired to project and view an image.

In certain industrial and scientific applications, rear projection screens permit the scientist or engineer to work directly on the screen as the image is being viewed without casting a shadow on the screen that would otherwise disturb the image. In addition, the individual could make actual measurements on the screen to determine the relative proportion of parts being viewed or operations being conducted and performed.

In the educational field, new teaching concepts are evolving whereby the typical small classrooms are being substituted by the relatively large rooms in which a team of teachers will handle a large number of students broken down into smaller teaching groups which may be determined by the progress being made by individual students. In other words, slower students will be in one group and the more advanced students in another group, etc., so that the latter will not necessarily be hindered in an educational sense by the former. In a situation of this type, a particular educational filmstrip would be shown to the advanced group one day and at some period thereafter, the same filmstrip would be shown to the slower group who would in the interim have had an opportunity to advance to a level at which they would be in a position to view the filmstrip in an educational sense. Under these circumstances, it would be somewhat undesirable to darken the large room containing all of the students for purposes of showing a filmstrip to a relatively small group.

Of course, the rear projection screens could be mechanically interconnected with projection apparatus. Inasmuch as the cost of such screens are somewhat disproportionate to that of the projection apparatus, it becomes economically desirable to disassociate the screen and render it structurally independent. When this is done, the manner of assembly, handling and storage are important considerations.

It is, therefore, a principal object of this invention to provide a small, portable, low-cost rear projection screen capable of serving a relatively large audience and one that may be readily folded to a substantially flat position to thereby facilitate handling, carrying and storage.

Another object is to provide a rear projection screen of this type which is adapted to be used in conjunction with substantially any type of projection apparatus whether it be for slides, filmstrip and most motion picture film.

A further object is to provide a rear projection screen of this type designed to withstand constant use in the classroom, library, office or exhibit and, at the same time, permit several separate viewings to take place in the same room without interfering with each other and with lights "on."

An important object is to provide a rear projection screen of this type which is capable of being folded to portfolio size thereby enabling any one to carry a rear projection screen anywhere for installation and assembly for maximum effects regardless of room lighting conditions or problems.

These and other objetcs are readily attained by providing a rear projection screen with a foldable cabinet capable of assuming an erect assembled position for image viewing and then folding to a collapsed substantially flat condition for carrying and storage when the screen is not in use. In general, the cabinet is provided with a pair of spaced substantially upright side panels, a top panel and a pair of bottom panels one spaced from the other and also at a higher elevation. The top and both of the bottom panels are hingedly connected to each of the side panels and, at the same time, are provided with a substantially centrally disposed hinge such that they may be folded inwardly of the cabinet and in substantially side-by-side position relative to the side panels when collapsing the cabinet. A rear projection screen extends across the forward opening defined by the side panels, top panel and elevated bottom panel. The screen is mounted across this opening in such a manner that it may readily be shifted to permit collapsing of the cabinet. A rear opening defined by the side panels and top panel together with the lowermost bottom panel accommodates a reflecting mirror which also is adapted to be shifted in such a manner to permit collapsing of the cabinet. An opening between the side panels and both of the bottom panels permits a projector to transmit an image onto the mirror which, in turn, reflects the image on the back of the screen for viewing purposes.

Other objects and advantages will become apparent from the following detailed description which is to be taken in conjunction with the accompanying drawings illustrating a single somewhat preferred embodiment of the invention and in which:

FIG. 3 is a longitudinal sectional view taken along the line 3—3 of FIG. 1 showing the general disposition of the projector in phantom as well as the reflecting mirror when shifted away from the rear opening when it is desired to collapse the screen cabinet;

FIG. 4 is a sectional view taken along the line 4—4 of FIG. 3;

Figure 1:
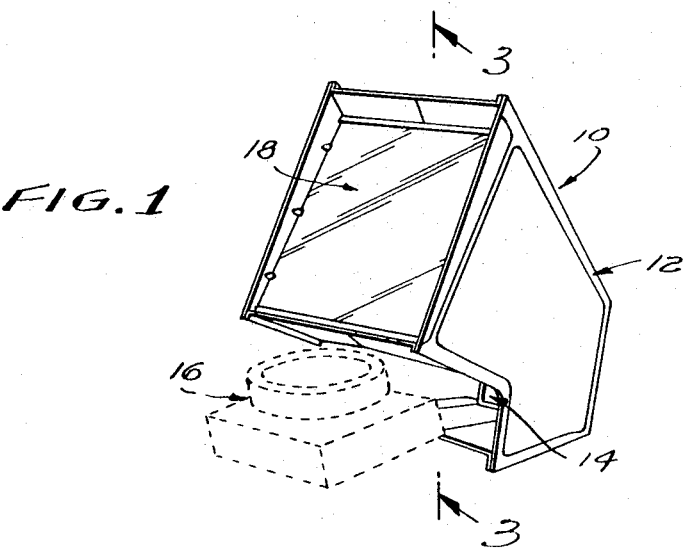
FIG. 1 is a front perspective view of a rear projection screen cabinet of this invention shown associated with a projector depicted by means of phantom lines.

In the drawings, a rear projection screen cabinet 10 is illustrated and includes a collapsible cabinet frame 12 mounting a reflector mirror 14 which is adapted to receive a projected image from a projector 16 and direct it on a rear projection screen 18 also mounted by the frame 12. The screen 18 may assume one of a number of different forms well known to the art of rear projection screens which are essentially semi-translucent and formed of either glass or a suitable resious material having the desired optical properties. In this connection, the glass or resinous material may be suitably treated as, for example, by frosting or otherwise treated with a suitable material for such purposes.

Turning now to the cabinet frame 12, a pair of upstanding side panels 20 and 22 are arranged in substantial converging relationship from front to rear as clearly shown in FIG. 4. Each of the shoulders includes a longitudinally extending rib or other shoulder producing structure 24 and 26, respectively, against which the screen 18 is adapted to rest. A number of lugs 28 and 30 on the respective side panels 20 and 22 are adapted to retain the screen 16 against the respective ribs 24 and 26. In view of the flexibility of the panels 20 and 22, the screen 18 is both adapted to override the forward beveled faces of the lugs 28 and 30 in assuming its mounted position and also to remove it from the cabinet 12. It should be understood that the present invention contemplates providing screen 18 with a hinged connection on the cabinet frame 12 as is the case with mirror 14.

At the rear of the cabinet 12 is disposed the mirror 14 which is conveniently mounted by means of a mirror mount 32 which is hingedly connected along one side to side panel 22 by means of the hinge 34. The other side of the hinge 32 and mirror 14 are adapted to be disposed in the latching groove 36. As will become evident shortly, the mirror 14 and associated mount 32 are adapted to be pivoted away from panel 20 towards panel 22 inwardly of the cabinet 12 when it is desired to collapse the cabinet from its erect assembled position.

The cabinet further includes a top panel 38, a lower bottom panel 40 and a spaced upper bottom panel 42 each of which are hinged to both of the side panels 20 and 22. In this connection, the top and bottom panels may be hingedly connected to the side panels by means of a separate hinged element or the illustrated integral hinged structure riveted to the side panels as shown. The top panel 38 and both of the bottom panels 40 and 42 are provided with integral centrally disposed hinges 44, 46 and 48, respectively. On the other hand, panel 38, 40 and 42 may be rigid and side panels 20 and 22 may be provided with an intermediate hinge. Elastic cords 50, 52 and 54 extend across the exterior side of the respective integral hinges 44, 46 and 48 of top panel 38, lower bottom panel 40 and upper bottom panel 42, respectively. Where necessary or convenient, this invention contemplates the elimination of these elastic cords. The ends of the cords 50, 52 and 54 are suitably anchored in their associated panels and serve to bias panel to a folded collapsed position. This elastic bias, on the other hand, cooperates in retaining the top panel 38 and both bottom panels 40 and 42 in a substantially planar position when fully assembled, upon pivoting the respective hinges 44, 46 and 48 past dead center in an outward direction.

Figure 2:
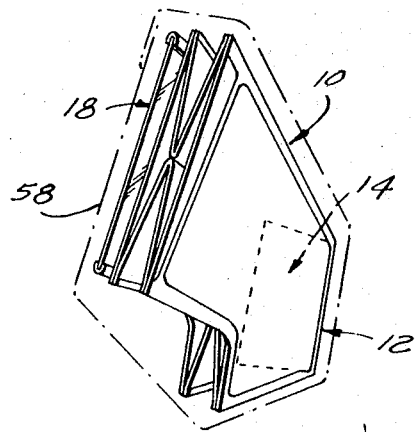
FIG. 2 illustrates the screen cabinet in collapsed condition in which it is adapted to be carried or stored, as the case may be, with an enclosing case shown in phantom.
Figure 5:
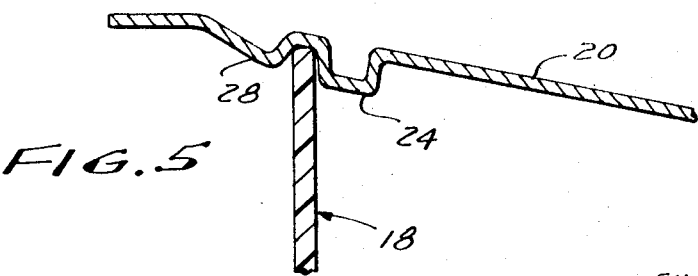
FIG. 5 is an enlarged sectional view taken along the line 5—5 of FIG. 3 showing the details of the screen support.
Figure 6:
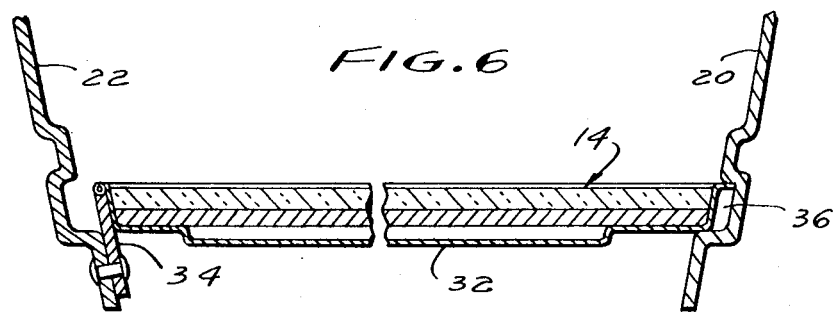
FIG. 6 is another enlarged sectional view taken along the line 6—6 of FIG. 3 showing the details of the mirror hinge and support.
Figure 7:
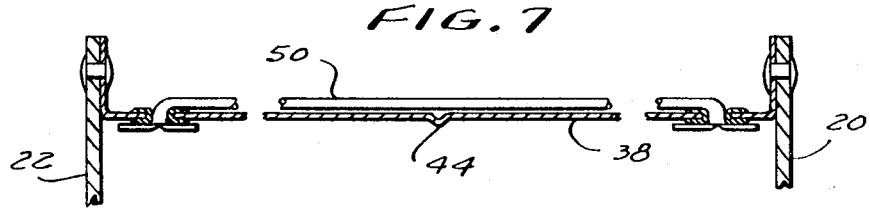
FIG. 7 is an enlarged sectional view showing the interconnection between the top panel and side panels viewed along the line 7—7 of FIG. 3.
Figure 8:
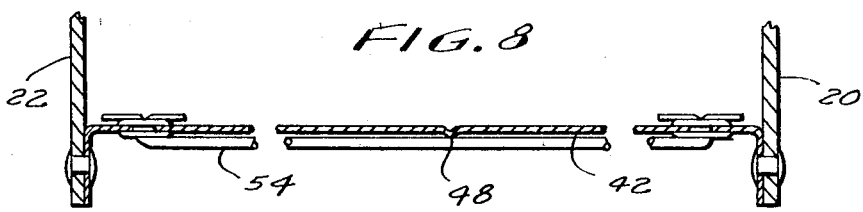
FIG. 8 is a sectional view showing the interconnection between the side panels and elevated bottom panel viewed along the line 8—8 of FIG. 3.
Figure 9:
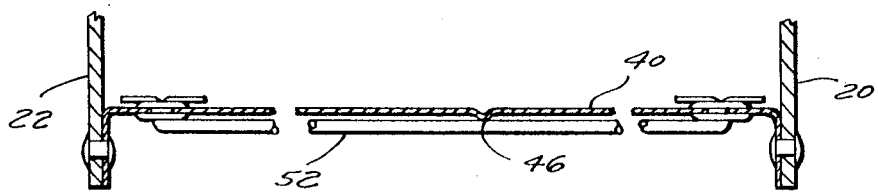
FIG. 9 is a sectional view of the interconnection between the lower bottom panel and the side panels as viewed along the line 9—9 of FIG. 3.

In operation, the assembled rear projection screen 10 assumes the disposition depicted in FIG. 1 at which it was adapted to rest upon a substantially horizontal surface whether it be a table, desk top or the like. The image from the projector 16 is adapted to be transmitted through the opening 56 defined by the side panels 20 and 22 and the bottom panels 40 and 42. When it is desired to place the rear projection screen 10 in a folded collapsed position for handling, carrying or storage, the disposition of parts depicted in FIG. 2 is assumed. In this connection, the screen 18 is removed from between the ribs 24 and 26 and the spaced lugs 28 and 30. The mirror 14 together with its supporting mount 32 is pivoted against the side panel 22. Thereafter the top panel 38 and both of the bottom panels 40 and 42 are shifted inwardly and the cabinet 12 is collapsed. The collapsed unit may be placed in a portfolio size carrying case 58 for ease of portability and/or storage.

When it is desired to erect the rear projection screen 10 and assemble it in the form illustrated in FIG. 1, the reverse procedure is followed. Thus, the top panel 38 and bottom panels 40 and 42 are shifted outwardly. The mirror 14 together with its mount 32 are pivoted to latch the mirror 14 and mount 32 in the accommodating groove 36. Thereafter, the screen 16 is shifted over the lugs 28 and 30 and secured against the ribs 24 and 26. In actual practice, the erected screen 10 can be used in two positions. It can be set upright on the lower edges of the side panels 20 and 22, as shown in FIG. 1, which is ideal for stand-up viewing or when placed on a low table. The erected screen 10 may also be positioned on one of its side panels 20 and 22 to provide a vertically positioned screen for viewing when seated or when used on an eye-level shelf.

In accordance with a successful application of this invention, a 14″ x 14″ screen 16 was employed and was of such a construction in nature that an image was yielded with the color contrast and brilliance normally found in high intensity arc projectors. When the cabinet was erected and disposed as in FIG. 1, the screen 16 was at approximately a 35° viewing angle. The cabinet folded flat to approximately one inch thickness for easy portability and minimum storage requirements. The panels were constructed of lightweight and inexpensive resinous material. Where it was found desirable or necessary, laminated panel construction was employed for the top and bottom panels. The successful unit weighed a total of only about four pounds and required about 15 seconds to assemble the unit in an erect position as illustrated in FIG. 1. In this condition, the unit was approximately 28 inches high but only required less than one square foot of desk space.

Although a single somewhat preferred embodiment of the invention has been disclosed and described in detail herein, it should be understood that this invention is in no sense limited thereby and its scope is to be determined by that of the appended claims.

I claim:

1. A collapsible rear projection screen cabinet which when in an assembled erect position is adapted to permit viewing of projected slides, filmstrip, motion picture film or other images and when in a folded collapsed position is adapted to assume a substantially flat conformation, said screen cabinet comprising:

a pair of spaced substantially vertical side panels;

a top panel hingedly connected to each of said side panels, hinge means intermediate said side panels defining a hinged joint in said top panel;

a lower bottom panel hingedly connected to each of said side panels, hinge means intermediate said side panels defining a hinged joint in said lower bottom panel;

an upper bottom panel hingedly connected to each of the side panels, hinge means intermediate said side panels defining a hinged joint in said upper bottom panel;

a reflecting mirror, means for extending the mirror across the rear of the cabinet and rear opening defined by the top, lower bottom and side panels, means for shifting the mirror away from the rear opening such that the cabinet is adapted to be folded to its folded collapsed position;

a rear projection screen, means for extending the screen across the front of the cabinet and front opening defined by the top, upper bottom and side panels, means for shifting the screen away from the front opening such that the cabinet is adapted to be folded to its folded collapsed position;

means for directing the image to be projected through the cabinet and reflected off the mirror onto the rear of the screen;

the said hinged connections and the said hinge means being operable to fold the top, and both of the bottom panels into the interior of the cabinet alongside the side panels after the mirror and screen have been shifted away from the respective rear and front openings.

2. The invention in accordance with claim 1 wherein the lower bottom panel is substantially horizontally disposed, the upper bottom panel is at an acute angle relative thereto and the top panel is at a larger angle relative thereto, said side panels converging towards one another from front to rear and the mirror and rear projection screen are at a relatively larger acute angle relative to the horizontal.

3. The invention in accordance with claim 2 wherein the screen is completely removable from the front opening and each side panel adjacent the front opening includes an elongated shoulder against which the rear of the screen is disposed and a number of spaced lugs on each of the side panels having a rear edge in engagement with the forward face of the screen and a forward beveled edge to facilitate overriding of the lugs by the screen when mounting the screen across the front opening.

4. The invention in accordance with claim 1 wherein a mirror mount supports the mirror, a hinge connecting the mirror mount to one of the side panels and a releasable latching structure on the other of said side panels for receiving the mirror mount to releasably latch the mirror mount together with the mirror across the rear opening and being operable to release the mirror mount and mirror therefrom so that they may be shifted away from the rear opening such that the cabinet is adapted to be folded to its collapsed position.

5. The invention in accordance with claim 1 wherein the hinge means of said top panel and both of said bottom panels extends substantially along the longitudinal center line of the cabinet, and an elastic cord on each of said top panel and both of said bottom panels extending across the associated hinge means to provide a biasing means whereby the top panel and both of said bottom panels are adapted to be maintained in a relatively flat condition thereby to retain the cabinet in its assembled erect position.

6. The invention in accordance with claim 1 wherein the cabinet includes an opening defined by the rear edge of the upper bottom panel and the front edge of the lower bottom panel and both of said side panels.

References Cited

UNITED STATES PATENTS

| | | | |
|---|---|---|---|
| 1,885,555 | 11/1932 | Schwartz | 88—24 |
| 2,617,328 | 11/1952 | Stableford | 88—24 |
| 2,685,817 | 8/1954 | Freeman | 88—24 |

NORTON ANSHER, Primary Examiner

WAYNE A. SIVERTSON, Assistant Examiner

U.S. Cl. X.R.

353—122